(12) United States Patent
Misaki

(10) Patent No.: US 11,529,920 B2
(45) Date of Patent: Dec. 20, 2022

(54) WORK VEHICLE

(71) Applicant: KUBOTA CORPORATION, Osaka (JP)

(72) Inventor: Shinji Misaki, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/046,009

(22) PCT Filed: Dec. 17, 2019

(86) PCT No.: PCT/JP2019/049344
§ 371 (c)(1),
(2) Date: Oct. 8, 2020

(87) PCT Pub. No.: WO2020/129961
PCT Pub. Date: Jun. 25, 2020

(65) Prior Publication Data
US 2021/0362666 A1    Nov. 25, 2021

(30) Foreign Application Priority Data
Dec. 20, 2018   (JP) .............................. JP2018-238889

(51) Int. Cl.
*B60R 21/13* (2006.01)
*B62D 33/06* (2006.01)

(52) U.S. Cl.
CPC ........ *B60R 21/131* (2013.01); *B62D 33/0617* (2013.01)

(58) Field of Classification Search
CPC ..... B60R 21/131; B60R 1/06; B62D 33/0617; B62D 49/00

USPC ......................................................... 280/756
See application file for complete search history.

(56) References Cited

U.S. PATENT DOCUMENTS

| | | | |
|---|---|---|---|
| 2014/0168009 A1* | 6/2014 | Peake .................. | G01C 21/165 |
| | | | 342/357.34 |
| 2017/0322550 A1* | 11/2017 | Yokoyama ............. | A01B 63/02 |
| 2020/0307693 A1* | 10/2020 | Kobayashi ............. | G01C 21/16 |
| 2020/0398780 A1* | 12/2020 | Kobayashi ........... | A01B 69/008 |
| 2021/0122391 A1* | 4/2021 | Hanada ................ | G05D 1/0278 |
| 2021/0300483 A1* | 9/2021 | Misaki ............... | B62D 33/0617 |

(Continued)

FOREIGN PATENT DOCUMENTS

| | | |
|---|---|---|
| JP | 08-207678 A | 8/1996 |
| JP | 2007-145143 A | 6/2007 |
| JP | 2016-154501 A | 9/2016 |

(Continued)

OTHER PUBLICATIONS

JP2016154501A Original document and translation retrieved from Espacenet on Nov. 5, 2021 (Year: 2016).*

(Continued)

*Primary Examiner* — Paul N Dickson
*Assistant Examiner* — Caitlin Anne Miller
(74) *Attorney, Agent, or Firm* — Keating and Bennett, LLP

(57) ABSTRACT

A work vehicle includes a rollover protection structure (ROPS) around a driver's seat and a receiver supported at an upper portion of the ROPS to receive positional information from a satellite. A harness for the receiver is routed along an outer peripheral surface of the ROPS. A cover is provided to cover the harness.

6 Claims, 7 Drawing Sheets

(56) References Cited

U.S. PATENT DOCUMENTS

2021/0311488 A1* 10/2021 Kurogi ................. A01B 69/006

FOREIGN PATENT DOCUMENTS

| JP | 2018-127208 A | | 8/2018 | | |
|---|---|---|---|---|---|
| JP | 2018-186727 A | | 11/2018 | | |
| JP | 2019071521 A | * | 5/2019 | ............. | B60R 11/02 |
| JP | 2020099224 A | * | 7/2020 | ............. | G01C 21/36 |
| JP | 2020100234 A | * | 7/2020 | ............. | B60R 16/02 |
| WO | 2018/147151 A1 | | 8/2018 | | |
| WO | 2019/142506 A1 | | 7/2019 | | |
| WO | WO-2021045099 A1 | * | 3/2021 | ............. | B60R 11/02 |
| WO | WO-2021131670 A1 | * | 7/2021 | ............. | B62D 25/06 |

OTHER PUBLICATIONS

JP2018127208A Original document and Translation retrieved from Espacenet on Nov. 5, 2021 (Year: 2018).*
Official Communication issued in International Patent Application No. PCT/JP2019/049344, dated Feb. 25, 2020.
Official Communication issued in corresponding European Patent Application No. 19900838.4, dated Aug. 26, 2022.
Zhang et al., "Method of an electronic controlled platooning system of agricultural vehicles", Vehicular Electronics and Safety (ICVES) 2009, Nov. 11, 2009, pp. 156-161.

* cited by examiner

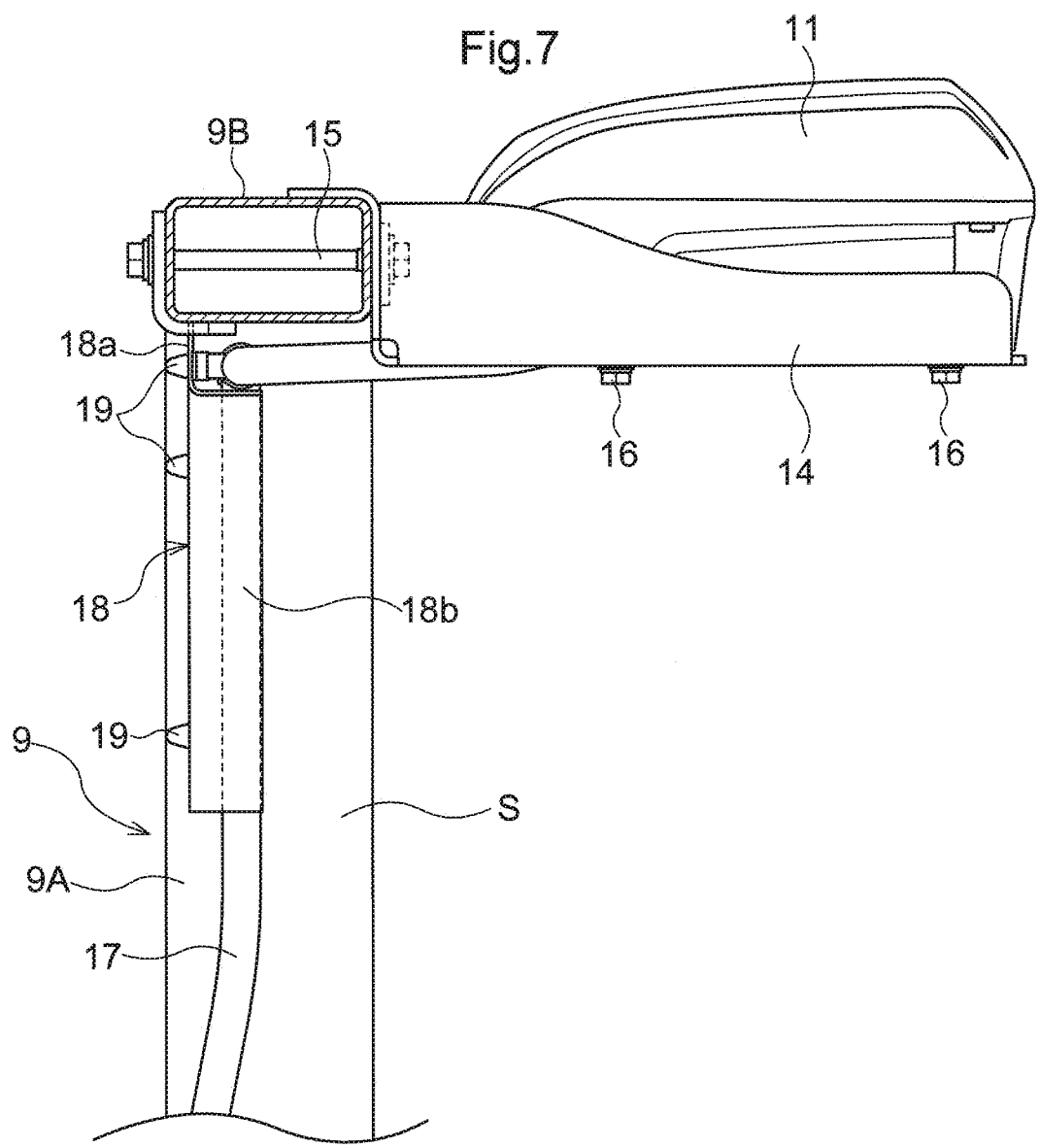

WORK VEHICLE

BACKGROUND OF THE INVENTION

1. Field of the Invention

The present invention is directed to a work vehicle including a receiving device which receives positional information from a satellite.

2. Description of the Related Art

As such a work vehicle described above, for example, the work vehicle described in JP2016-154501A has been already known. The work vehicle described in JP2016-154501A includes a rollover protection structure (ROPS) ("ROPS 26" in JP2016-154501A) disposed around a driver's seat and a receiving device ("receiving antenna 51" in JP2016-154501A) which receives positional information from a satellite. In the work vehicle described in JP2016-154501A, the receiving device is supported at an upper part of the ROPS.

SUMMARY OF THE INVENTION

In the work vehicle described in JP2016-154501A, there is a need to extend a harness for the receiving device downward from the upper portion of the ROPS in order to connect the harness for the receiving device to a controller. In this case, there is a room for consideration of how to route the harness in order to route the harness easily.

In view of the above situation, there is a demand for a work vehicle in which the harness for the receiving device can be routed easily.

According to an example preferred embodiment of the present invention, a work vehicle includes a rollover protection structure (ROPS) disposed around a driver's seat, and a receiver supported at an upper portion of the ROPS to receive positional information from a satellite, wherein a harness for the receiver is routed along an outer peripheral surface of the ROPS, and a cover is provided to cover the harness.

With such a structure, the harness is able to be routed easily along the outer peripheral surface of the ROPS. Also, by covering the harness with the cover, it is possible to protect the harness, reduce exposure of the harness, and improve an appearance of the harness.

Further preferably in another example preferred embodiment of the present invention, the harness may be routed along an inner side portion in the outer peripheral surface of the ROPS, the inner side portion being directed to an inner side of a vehicle body, and the cover is configured to cover the harness from front and below.

With such a structure, the harness is located on the inner side of the vehicle body relative to the ROPS. As a result, it is possible to prevent the harness from being contacted by an object from outside the vehicle body. Also, by covering the harness with the cover from front and below, it is possible to reduce exposure of the harness to a driver's seat side.

Further preferably in a further example preferred embodiment of the present invention, the ROPS may be located laterally outside relative to the driver's seat, and may include a pair of right and left struts extending in a vertical direction and a beam located on an upper side relative to the driver's seat and extending in a right-left direction of the vehicle body, the receiver may be supported at the beam, the harness may be routed between/across the beam and the struts, and the cover may extend between/across the beam and the struts.

With such a structure, the receiver is supported at the beam located at a relatively high position in the ROPS. As a result, the receiver is able to favorably receive positional information without being affected by an obstacle. Also, by routing the harness between/across the beam and the struts, the harness can be easily extended downward from the beam. Further, since the cover extends between/across the beam and the struts, the harness can be covered with the cover over a longer section from the beam to the struts.

Further preferably in yet another example preferred embodiment of the present invention, in order to allow the harness to enter from a rear side to the inside of the cover, the cover has a cross-sectional shape which is opened rearward.

With such a structure, by making the harness enter from a rear side of the cover to the inside of the cover, the harness is able to be easily attached.

Further preferably in an additional example preferred embodiment of the present invention, the harness is fixed to the cover by a fixing tool.

As a result, it is possible to prevent the harness from being detached from the cover.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a view in section taken on VII-VII in FIG. 5.

DETAILED DESCRIPTION OF THE PREFERRED EMBODIMENTS

Preferred embodiments of the present invention will be described with reference to drawings.

Figure 1:
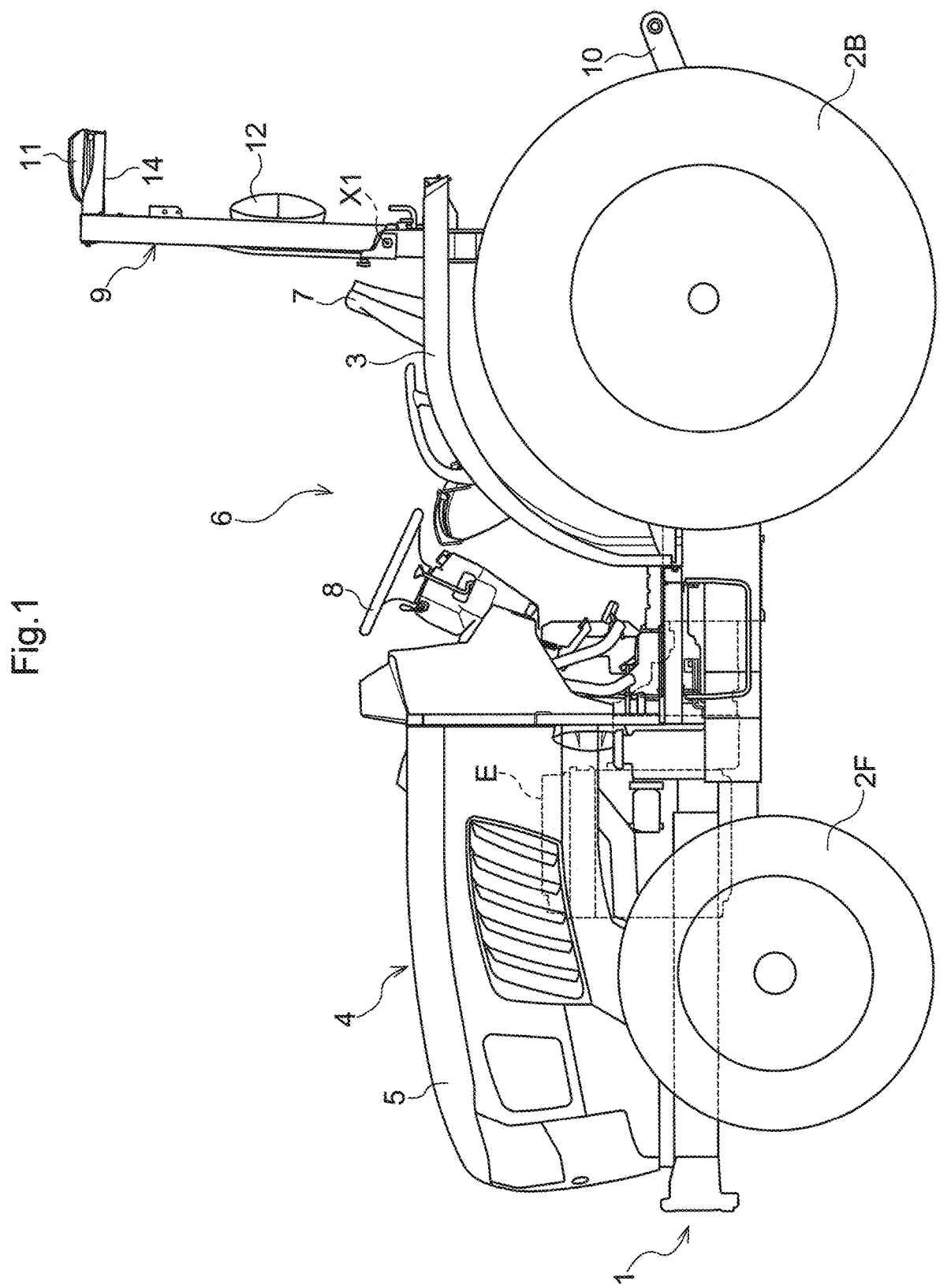
FIG. 1 is a left side view showing a tractor.
Figure 2:
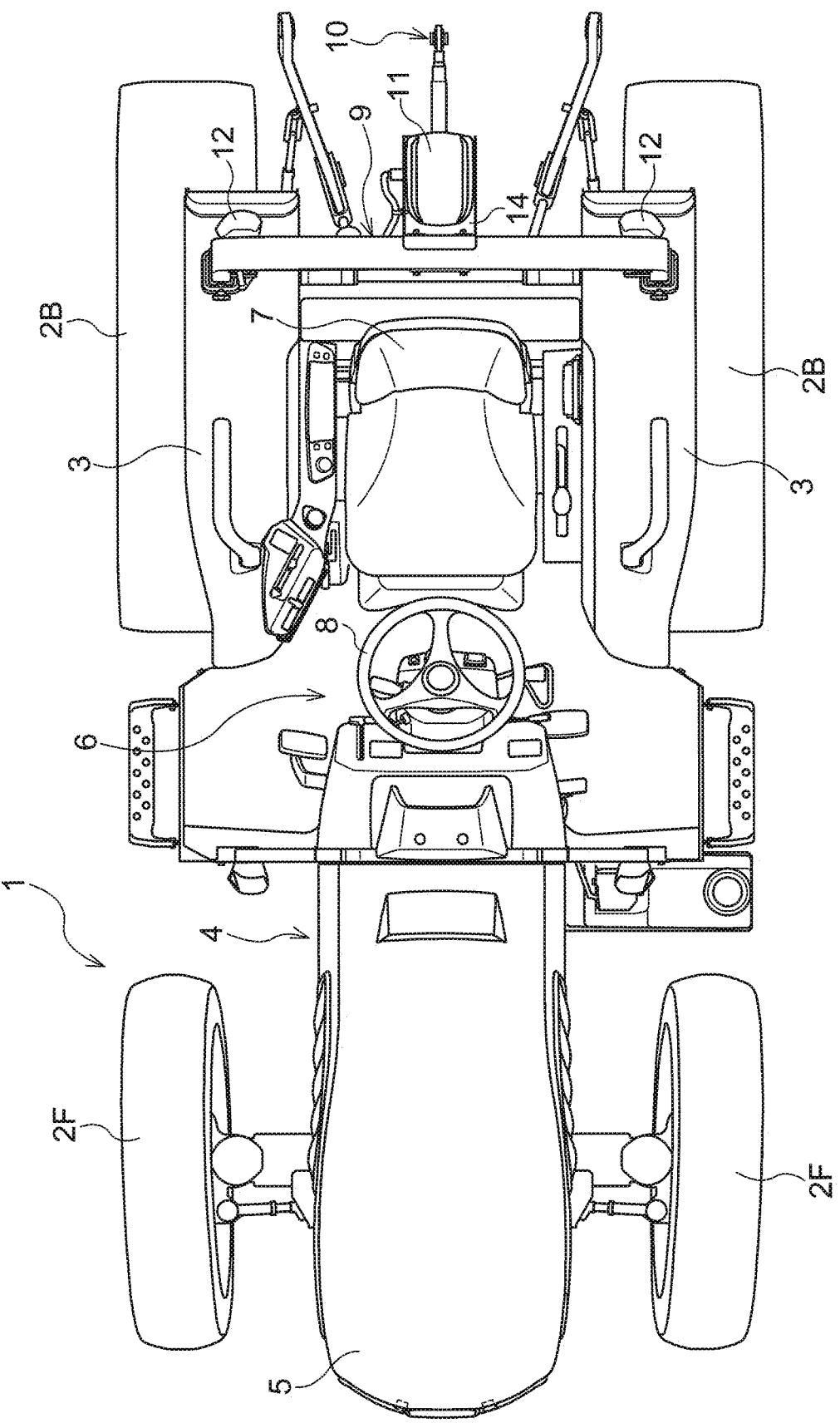
FIG. 2 is a plan view showing a tractor.

FIG. 1 and FIG. 2 show a tractor (work vehicle). The tractor includes a traveling vehicle body 1. The traveling vehicle body 1 is a four-wheel-drive traveling vehicle body, for example. The traveling vehicle body 1 includes a pair of drivable-steerable right and left front wheels 2F, and a pair of drivable right and left rear wheels 2B. A pair of right and left fenders 3 are disposed to cover the pair of right and left rear wheels 2B, respectively.

At a front half portion of traveling vehicle body 1, there is provided an engine section 4. At the engine section 4, there are provided an engine E and a hood 5 which houses the engine E. At a rear portion of the traveling vehicle body 1, there is provided a driving section 6 on which a driver rides. The driving section 6 includes a driver's seat 7 on which the driver sits, and a steering wheel 8 to steer the traveling vehicle body 1. A rollover protection structure (ROPS) 9 is provided around the driver's seat 7. At a rear end portion of the traveling vehicle body 1, there is provided a link mechanism 10 to which an implement (not shown) such as a rotary cultivator or the like is attached.

The tractor includes a global positioning system (GPS) antenna unit 11 (receiving device or receiver) and an inertial measurement unit (not shown). The GPS antenna unit is a unit which receives positional information from a global positioning system (GPS) satellite and measures a position of the traveling vehicle body 1 based on the received positional information. The inertial measurement unit is a unit which measures inertial information (such as a yaw angle, a pitch angle and a roll angle) of the traveling vehicle body 1. The tractor includes an automatic steering mechanism (not shown) which automatically steers the traveling vehicle body 1 so as to allow the traveling vehicle body 1 to travel along a target travel route based on the position of the traveling vehicle body 1 measured by the GPS antenna unit 11 and on the inertial information of the traveling vehicle body 1 measured by the inertial measurement unit.

Figure 3:
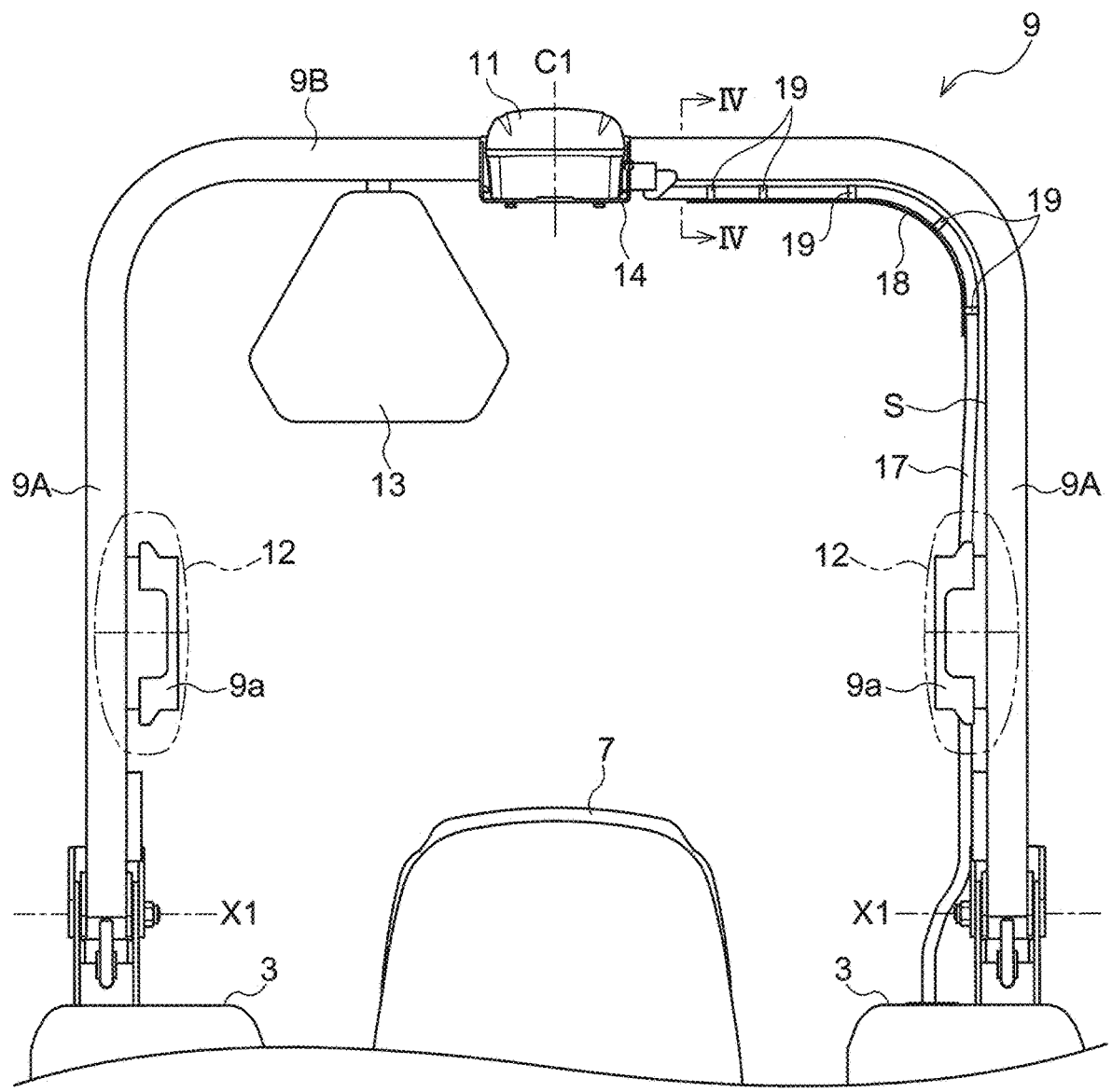
FIG. 3 is a rear view showing a rollover protection structure (ROPS).
Figure 4:
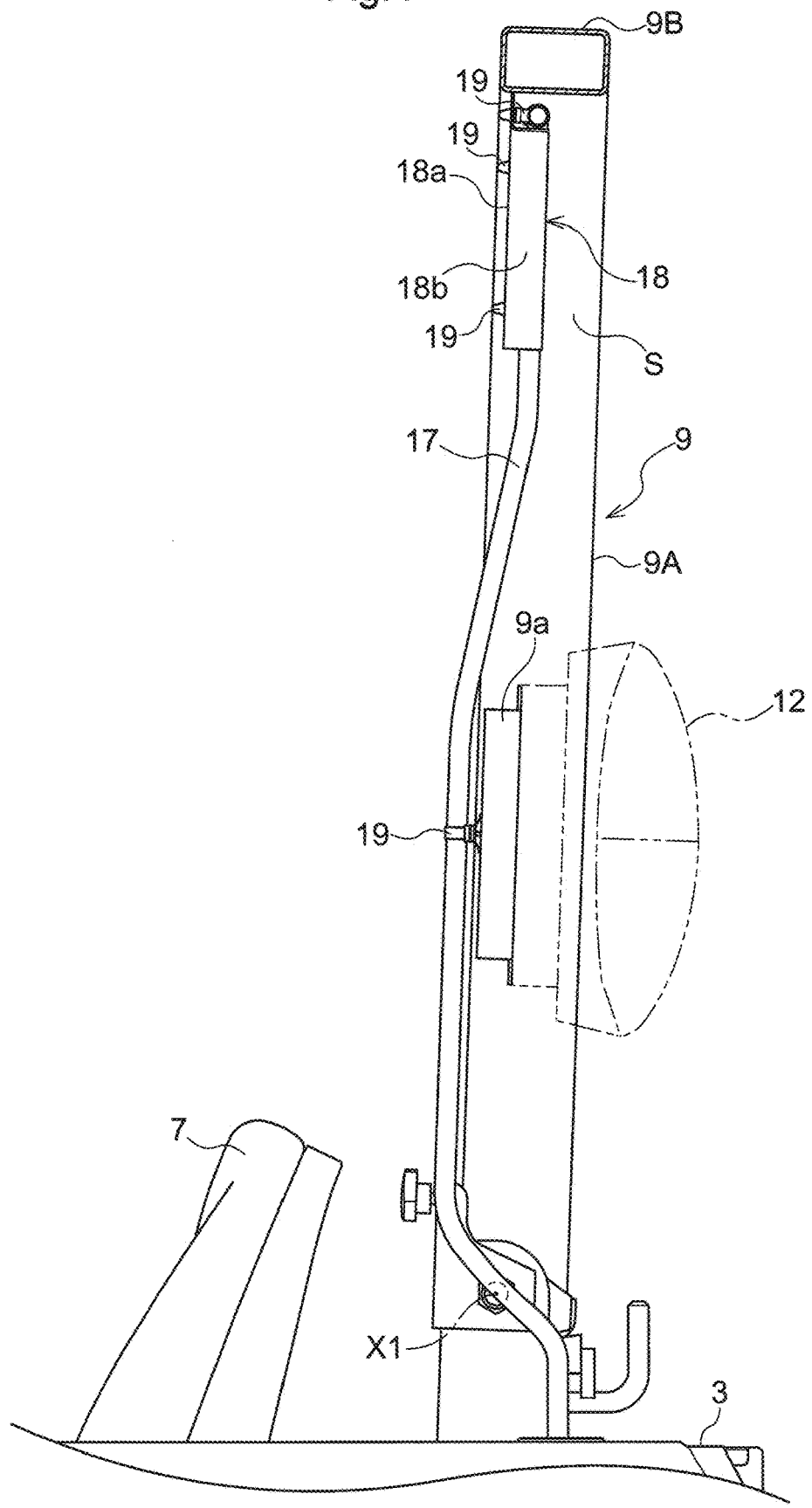
FIG. 4 is a view in section taken on IV-IV in FIG. 3.
Figure 5:
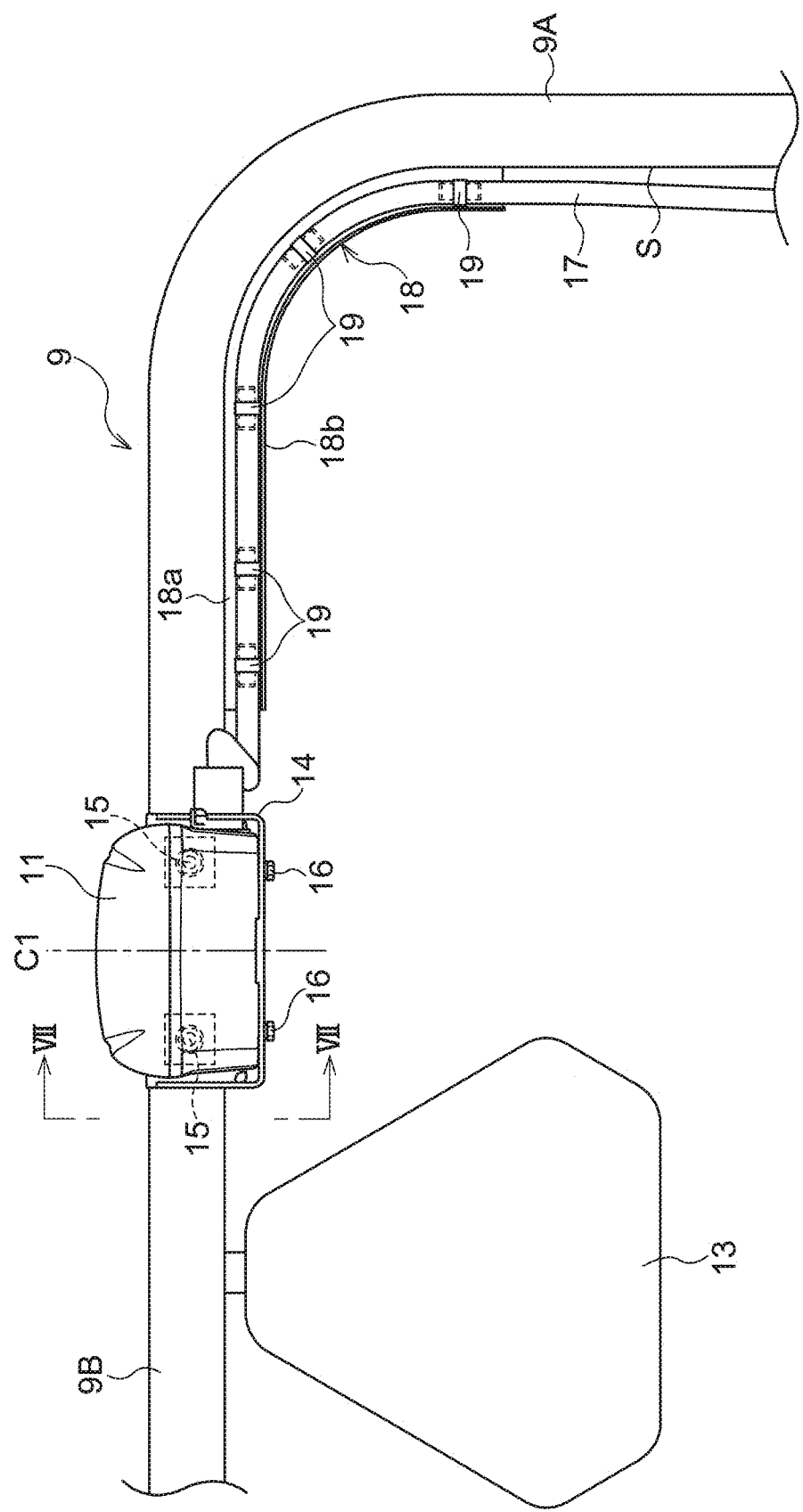
FIG. 5 is a rear view showing a harness and a harness cover.
Figure 6:
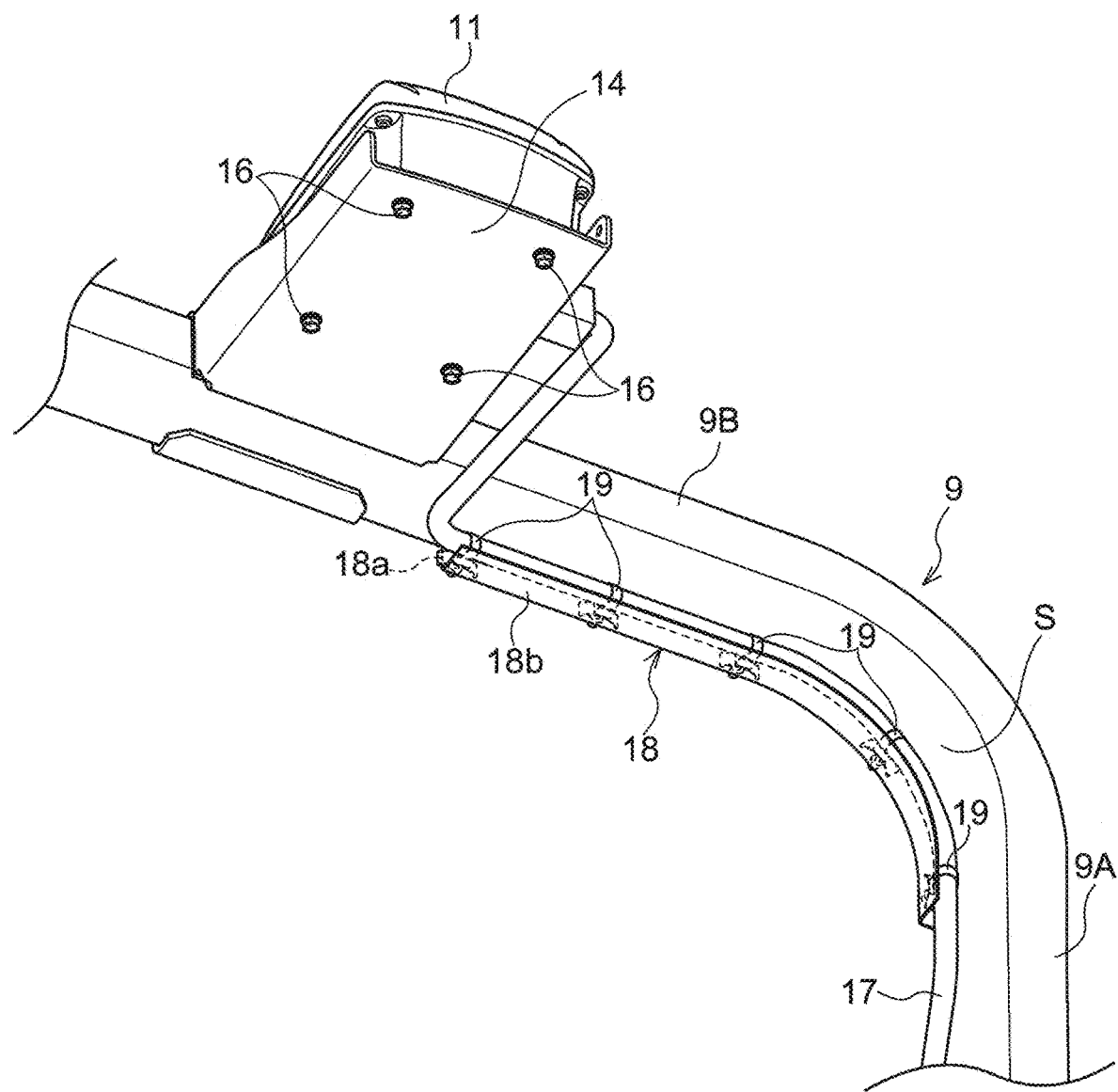
FIG. 6 is a perspective view showing the harness and the harness cover.

As shown in FIG. 3 and FIG. 4, the ROPS 9 is located on lateral outer sides relative to the driver's seat 7, and includes a pair of right and left strut parts 9A which extend in the vertical direction, and a beam part 9B which is located upward of the driver's seat 7 and extends in a right-left direction of the vehicle body. The ROPS 9 is foldable rearward around an axis X1 which extends in the right-left direction of the vehicle body.

Rear combination lamps 12 are attached to the left strut part 9A and the right strut part 9A, respectively. In the left strut part 9A and the right strut part 9A, there are respectively provided attaching parts 9a to which the rear combination lamps 12 are attached, respectively. A low-speed vehicle mark 13 is attached to the beam part 9B. The low-speed vehicle mark 13 is located at a position deviated to a left side relative to a right-left center C1 of the beam part 9B (a right-left center of the vehicle body).

As shown in FIG. 3 to FIG. 7, the GPS antenna unit is supported to an upper portion of the ROPS 9. Specifically, the GPS antenna unit 11 is supported at a right-left central portion of the beam part 9B, a right-left center thereof being in alignment with the right-left center of the vehicle body (the right-left center C1 of the beam part 9B). At the right-left center of the beam part 9B, there is provided a GPS stay 14 which supports the GPS antenna unit 11. The GPS stay 14 is supported (cantilevered) to the beam part 9B, the GPS stay 14 projecting rearward from the beam part 9B. The GPS stay 14 is fixed to the beam part 9B by a bolt 15 which penetrates through the beam part 9B from a front. The GPS antenna unit 11 is fixed to the GPS stay 14 by a bolt 16 which penetrates through the GPS stay 14 from below, the GPS antenna unit 11 being mounted on and supported to the GPS stay 14.

The harness 17 for the GPS antenna unit 11 is provided between/across the GPS antenna unit 11 and a controller (not shown) which controls the automatic steering mechanism and the like. The harness 17 is routed along the outer peripheral surface of the ROPS 9. Specifically, the harness 17 is routed along an inner side portion S in the outer peripheral face of the ROPS 9, the inner side portion S being directed to an inner side of the vehicle body. The harness 17 is routed between/across a right-side portion of the beam part 9B and the right strut part 9A, the harness 17 being drawn out from a right-side portion of the GPS antenna unit 11 to an opposite side (right side) of a side at which the low-speed vehicle mark 13 is located, relative to the GPS antenna unit 11. The harness 17 extends downward along a front side of a right attaching part 9a, and penetrates through a rear-side part relative to the axis X1 in the right fender 3 and extends to the controller.

There is provided a cover 18 which is configured to cover the harness 17. The cover 18 extends between/across the right-side portion of the beam part 9B and an upper portion of the right strut part 9A. The harness 17 is fixed by fixing tools 19 to the cover 18 (vertical part 18a) and the right attaching part 9a. The cover 18 includes a portion which extends along the right-side portion of the beam part 9B, a portion which extends along the upper portion of the right strut part 9A, and a portion which extends along a curved portion between/across the beam part 9B and the right strut part 9A. The cover 18 is configured to cover the harness 17 from the front and from a side opposed to the inner side portion S (from below and from a lateral inner side, for example). In order to allow the harness 17 to enter from a rear side to the inside of the cover 18, the cover 18 has a cross-sectional shape (an approximately L-letter cross-sectional shape) which is opened rearward. The cover 18 includes the vertical portion 18a which is vertical to the inner side portion S, and a bottom portion 18b extending rearward from an end portion, in the vertical portion 18a, on a side opposing to the inner side portion S, the bottom portion 18b extending parallel with the inner side part S.

Other Preferred Embodiments

In the foregoing example preferred embodiment, the harness 17 preferably is routed along the inner side portion S in the outer peripheral surface of the ROPS 9, the inner side portion S being directed to an inner side of the vehicle body. However, the harness 17 may be routed along an outer side portion in the outer peripheral surface of the ROPS 9 (such as a front surface, a rear surface, an upper surface and a lateral outer surface of the ROPS 9), the outer side portion being directed to an outer side of the vehicle body.

In the foregoing example preferred embodiment, the harness 17 preferably is routed between/across the right-side portion of the beam part 9B and the right strut part 9A. However, the harness 17 may be routed between/across a left-side portion of the beam part 9B and the left strut part 9A.

In the foregoing example preferred embodiment, the cover 18 extends between/across the right-side portion of the beam part 9B and the upper portion of the right strut part 9A. That is, the cover 18 does not cover a portion in the harness 17 lower than the upper portion of the right strut part 9A. However, the cover 18 may extend between/across the right-side portion of the beam part 9B and a lower portion of the right strut part 9A. That is, the cover 18 may cover the portion in the harness 17 lower than the upper portion of the right strut part 9A, too.

In the foregoing example preferred embodiment, in order to allow the harness 17 to enter from a rear side into the inside of the cover 18, the cover 18 has the cross-sectional shape which is opened rearward. However, in order to allow the harness 17 to enter from a front side into the inside of the cover 18, the cover 18 may have a cross-sectional shape which is opened forward. Still alternatively, the cover 18 may have an approximately U-shaped cross-sectional shape (a cross-sectional shape which is not opened forward, rearward or downward).

Example preferred embodiments of the present invention can be used for a work vehicle (a tractor, for example) including a receiving device which receives positional information from a satellite.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
   a rollover protection structure (ROPS) disposed around a driver's seat; and
   a receiver supported at an upper portion of the ROPS to receive positional information from a satellite; wherein
   a harness for the receiver is routed along an outer peripheral surface of the ROPS;
   a cover is provided to cover the harness;
   the ROPS is foldable rearward around an axis extending in a right-left direction of a vehicle body; and
   the cover includes a lower end above the axis.

2. The work vehicle according to claim 1, wherein
   the harness is routed along an inner side portion in the outer peripheral surface of the ROPS, the inner side portion being directed to an inner side of the vehicle body; and
   the cover is configured to cover the harness from a front and below.

3. The work vehicle according to claim 2, wherein
   the ROPS is laterally outside relative to the driver's seat, the ROPS including a pair of right and left struts extending in a vertical direction, and a beam at an upper side relative to the driver's seat and extending in the right-left direction of the vehicle body;
   the receiver is supported at the beam;
   the harness is routed between or across the beam and the struts; and
   the cover extends between or across the beam and the struts.

4. A work vehicle comprising:
   a rollover protection structure (ROPS) disposed around a driver's seat; and
   a receiver supported at an upper portion of the ROPS to receive positional information from a satellite; wherein
   a harness for the receiver is routed along an outer peripheral surface of the ROPS;
   a cover is provided to cover the harness; and
   in order to allow the harness to enter from a rear side to an inside of the cover, the cover has a cross-sectional shape which is always opened rearward and extends along the ROPS.

5. The work vehicle according to claim 1, wherein the harness is fixed to the cover by a fixing tool.

6. A work vehicle comprising:
   a rollover protection structure (ROPS) disposed around a driver's seat; and
   a receiver supported at an upper portion of the ROPS to receive positional information from a satellite; wherein
   a harness for the receiver is routed along an outer peripheral surface of the ROPS;
   a cover is provided to cover the harness;
   the ROPS is foldable rearward around an axis extending in a right-left direction of a vehicle body; and
   the harness penetrates through a portion of a fender rearward of the axis and extends to a position inside the fender.

* * * * *